United States Patent
Mashiko et al.

(10) Patent No.: US 11,554,376 B2
(45) Date of Patent: Jan. 17, 2023

(54) CONTAINER AND CALIBRATION STANDARD PLATE

(71) Applicant: RICOH COMPANY, LTD., Tokyo (JP)

(72) Inventors: Ryuya Mashiko, Tokyo (JP); Satoshi Izumi, Tokyo (JP); Hiroki Somada, Shizuoka (JP); Takahiko Matsumoto, Kanagawa (JP); Daisuke Takagi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 716 days.

(21) Appl. No.: 16/467,232

(22) PCT Filed: Dec. 7, 2017

(86) PCT No.: PCT/JP2017/044101
§ 371 (c)(1),
(2) Date: Jun. 6, 2019

(87) PCT Pub. No.: WO2018/110438
PCT Pub. Date: Jun. 21, 2018

(65) Prior Publication Data
US 2020/0070148 A1    Mar. 5, 2020

(30) Foreign Application Priority Data

Dec. 15, 2016  (JP) .............................. JP2016-243656
Nov. 13, 2017  (JP) .............................. JP2017-218554

(51) Int. Cl.
*B01L 3/00*  (2006.01)

(52) U.S. Cl.
CPC ....... *B01L 3/5085* (2013.01); *B01L 2200/148* (2013.01); *B01L 2300/021* (2013.01);
(Continued)

(58) Field of Classification Search
CPC ...................................................... B01L 3/5085
(Continued)

(56) References Cited

U.S. PATENT DOCUMENTS 6,285,285 B1   9/2001   Mongrenier
6,699,437 B1   3/2004   Astle
(Continued)

FOREIGN PATENT DOCUMENTS

CA   2 945 126 A1   9/2014
CA   2 915 475 A1   11/2014
(Continued)

OTHER PUBLICATIONS

International Search Report dated Mar. 19, 2018 for counterpart International Patent Application No. PCT/JP2017/044101 filed Dec. 7, 2017.
(Continued)

*Primary Examiner* — Christine T Mui
*Assistant Examiner* — Emily R. Berkeley
(74) *Attorney, Agent, or Firm* — Grüneberg and Myers PLLC

(57) ABSTRACT

Provided is a container (10) including a base material (1) including a plurality of concave portions (2); a recognition unit (3) disposed on the base material and configured to recognize the base material; and a storage unit (4) disposed in a position other than a measurement region of the base material and configured to store information on biomaterials contained in the plurality of concave portions, wherein the recognition unit and the storage unit are allowed to correspond to each other.

18 Claims, 4 Drawing Sheets

(52) U.S. Cl.
CPC . *B01L 2300/024* (2013.01); *B01L 2300/0829* (2013.01); *B01L 2300/0861* (2013.01)

(58) Field of Classification Search
USPC ........................................................ 422/552
See application file for complete search history.

(56) References Cited

U.S. PATENT DOCUMENTS

| | | | |
|---|---|---|---|
| 2001/0055800 | A1 | 12/2001 | Bara |
| 2002/0142318 | A1 | 10/2002 | Cattell et al. |
| 2003/0124583 | A1 | 7/2003 | Staab |
| 2003/0156996 | A1 | 8/2003 | Delorme |
| 2003/0231986 | A1 | 12/2003 | Kocher |
| 2005/0158791 | A1 | 7/2005 | Cattell et al. |
| 2005/0169797 | A1 | 8/2005 | Oshima |
| 2006/0099567 | A1 | 5/2006 | Muller-Cohn et al. |
| 2008/0238627 | A1 | 10/2008 | Oldham et al. |
| 2011/0001609 | A1 | 1/2011 | Oldham et al. |
| 2013/0198529 | A1 | 8/2013 | Fuhr et al. |
| 2014/0260118 | A1 | 9/2014 | Knight |
| 2015/0346068 | A1* | 12/2015 | Kulak ................. G01N 33/6842 530/417 |
| 2016/0096175 | A1 | 4/2016 | Pallas et al. |
| 2018/0340880 | A1 | 11/2018 | Matsumoto et al. |

FOREIGN PATENT DOCUMENTS

| | | |
|---|---|---|
| EP | 1 048 723 A1 | 11/2000 |
| EP | 1 374 987 A1 | 1/2004 |
| GB | 2 395 484 A | 5/2004 |
| JP | 8-240589 A | 9/1996 |
| JP | 2003-526789 A | 9/2003 |
| JP | 2006-89115 A | 4/2006 |
| JP | 4204753 B2 | 10/2008 |
| JP | 2009-517086 A | 4/2009 |
| JP | 4390393 B2 | 10/2009 |
| JP | 2011/017707 | 1/2011 |
| JP | 4661012 B2 | 1/2011 |
| JP | 4849975 B2 | 10/2011 |
| JP | 2018-9956 A | 1/2018 |
| WO | 03/096015 | 11/2003 |
| WO | WO 2017/130707 A1 | 8/2017 |

OTHER PUBLICATIONS

Written Opinion dated Mar. 19, 2018 for counterpart International Patent Application No. PCT/JP2017/044101 filed Dec. 7, 2017.
Liesbet Deprez, et al., "Validation of a digital PCR method for quantification of DNA copy number concentrations by using a certified reference material," Biomolecular Detection and Quantification, vol. 9, XP055458498, 2016, pp. 29-39.
Canadian Office Action dated Aug. 11, 2020 in Patent Application No. 3,046,428, 6 pages
Canadian Office Action dated Jan. 15, 2021 in Patent Application No. 3,046,428, 4 pages.
Japanese Office Action dated Oct. 5, 2021 in Japanese Application No. 2017-218554, with English translation, 16 pages.
Chinese Office Action dated Jul. 26, 2021 in Chinese Application No. 201780076396.X with Engtish translation.
Xiaoqing Pan et al, "*Physics Experiment Tutorial*", Beihang Univsity Press, pp. 24-29, Sep. 2016 with English translation.

* cited by examiner

[Fig. 1]
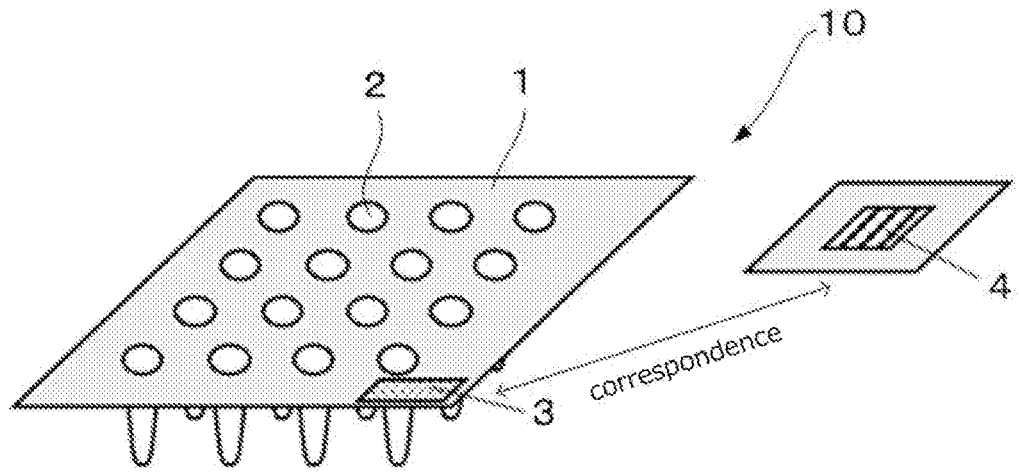
[Fig. 2]
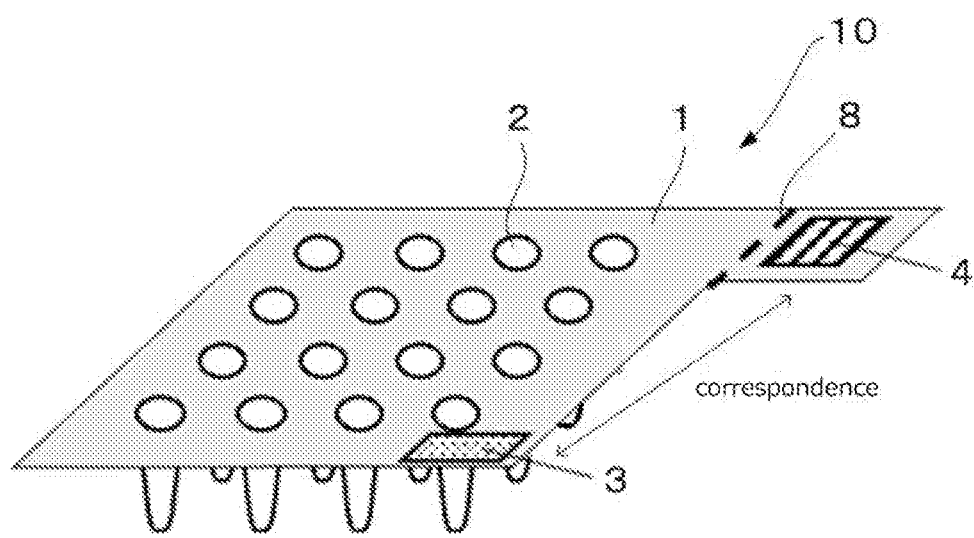
[Fig. 3]
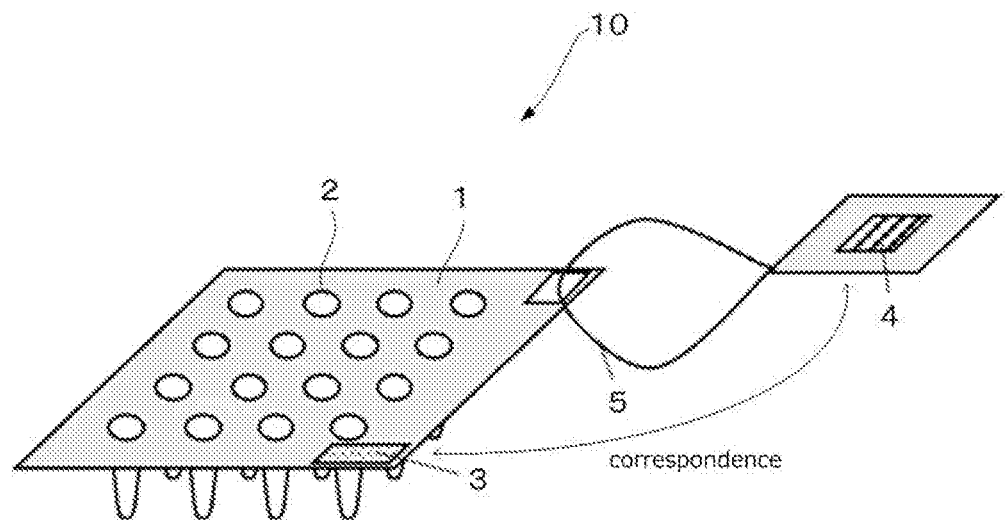

[Fig. 4A]
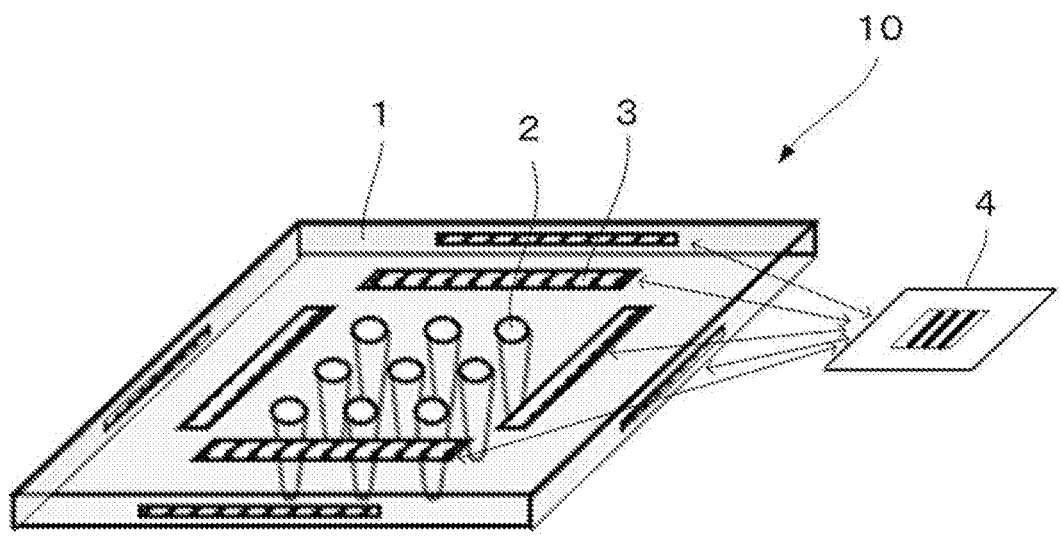
[Fig. 4B]
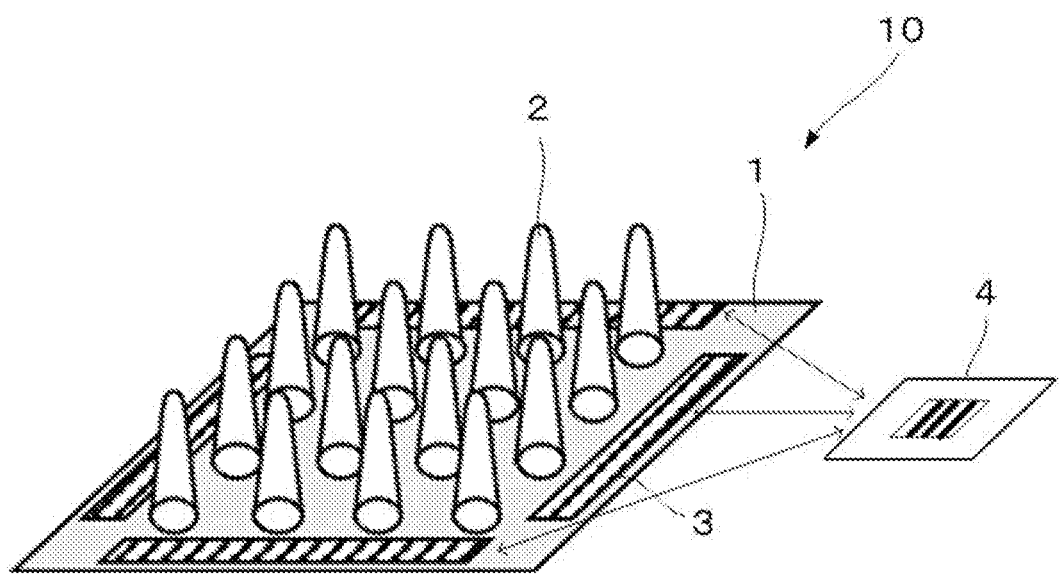
[Fig. 5]
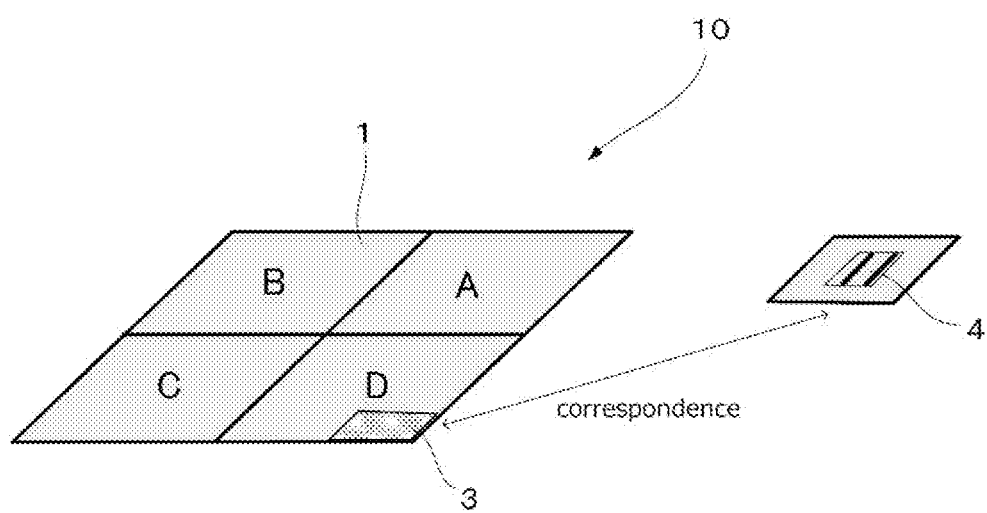

[Fig. 6]
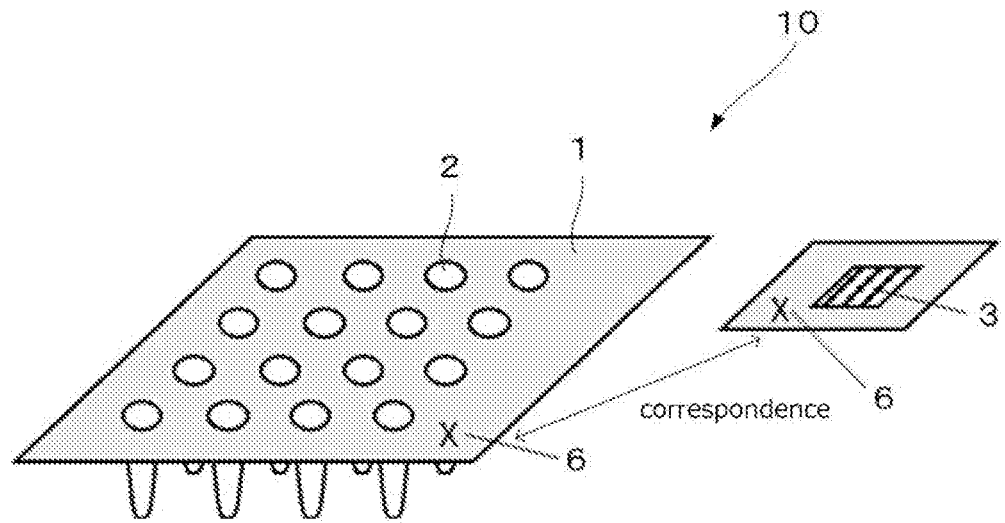
[Fig. 7]
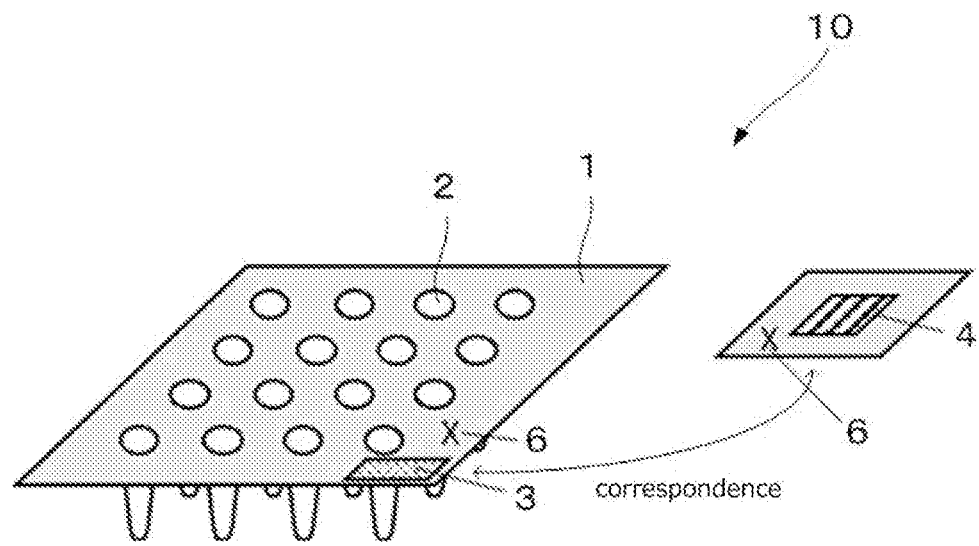

[Fig. 8]
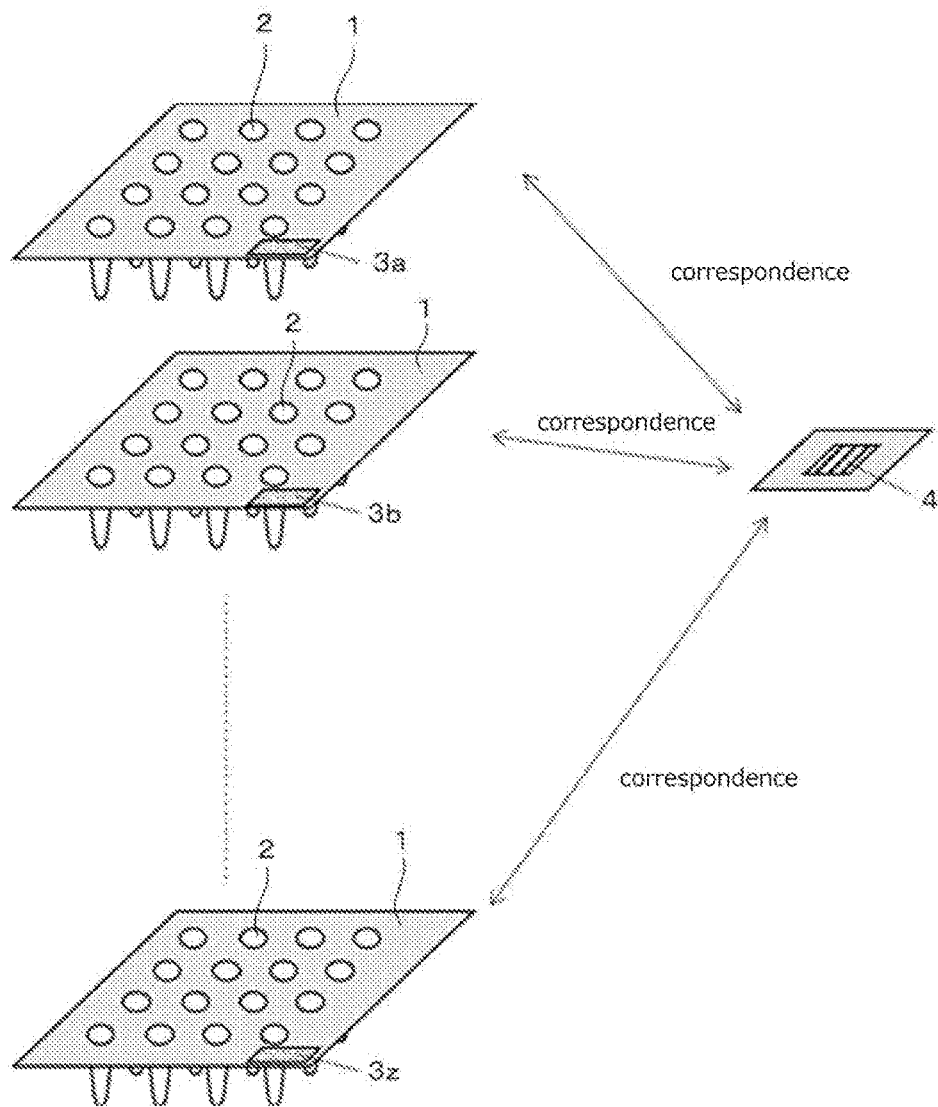
[Fig. 9]
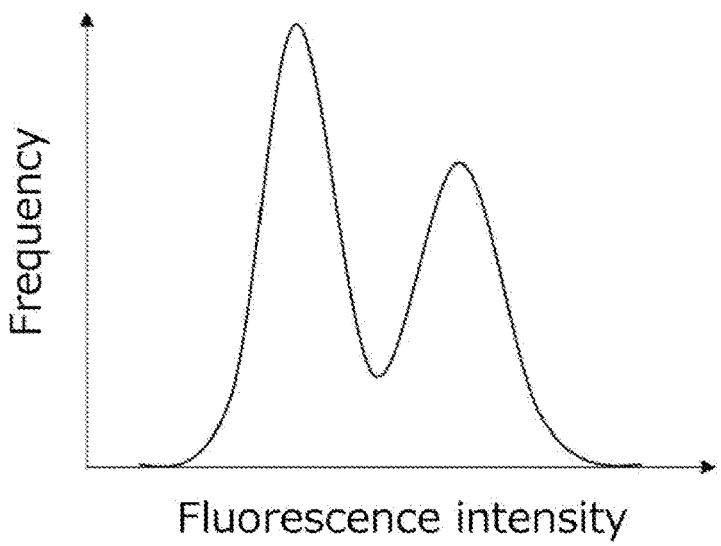

CONTAINER AND CALIBRATION STANDARD PLATE

TECHNICAL FIELD

The present invention relates to a container and a calibration standard plate suitably used in, for example, biotechnology-related industries, life science industries, and medical industries.

BACKGROUND ART

Hitherto, systems for storing, tracking, and searching data regarding biological materials and samples have been proposed for the purposes of using, organizing, storing, tracking, searching, and analyzing the biological materials and the samples, and automating these processes (see, for example, PTL 1).

Containers (e.g., Polymerase Chain Reaction (PCR) plates) configured to store or analyze the biological materials and readers configured to store, track, and search data regarding analyzed biological samples have also been proposed.

In blood packs which include storage units configured to store information for tracking contents of the blood packs, it is difficult for the storage units to be disposed in the blood packs upon forming blood pack containers and the blood pack containers need to be prevented from being heated. Therefore, methods for allowing the storage units to be attachable and detachable have also been proposed (see, for example, PTL 2).

CITATION LIST

Patent Literature

[PTL 1] Japanese Translation of PCT International Application Publication No. JP-T-2009-517086
[PTL 2] Japanese Patent No. 4204753

SUMMARY OF INVENTION

Technical Problem

The present invention has an object to provide a container in which a base material is allowed to correctly correspond to a storage unit configured to store information on biomaterials contained in a plurality of concave portions of the base material.

Solution to Problem

The container of the present invention as a means for solving the above problems includes a base material including a plurality of concave portions; a recognition unit disposed on the base material and configured to recognize the base material; and a storage unit disposed on the base material and configured to store information on biomaterials contained in the plurality of concave portions. The recognition unit and the storage unit are allowed to correspond to each other.

Advantageous Effects of Invention

The present invention can provide the container in which a base material is allowed to correctly correspond to a storage unit configured to store information on biomaterials contained in a plurality of concave portions of the base material.

BRIEF DESCRIPTION OF DRAWINGS

FIG. 1 is a schematic perspective view illustrating an example of a container of the present invention.
FIG. 2 is a schematic perspective view illustrating another example of a container of the present invention.
FIG. 3 is a schematic perspective view illustrating another example of a container of the present invention.
FIG. 4A is a schematic perspective view illustrating another example of a container of the present invention viewed from a front surface of the container.
FIG. 4B is a schematic perspective view illustrating another example of a container of the present invention viewed from a back surface of the container.
FIG. 5 is a schematic perspective view illustrating another example of a container of the present invention.
FIG. 6 is a schematic perspective view illustrating another example of a container of the present invention.
FIG. 7 is a schematic perspective view illustrating another example of a container of the present invention.
FIG. 8 is a schematic perspective view illustrating an example of a container of the present invention, the container including a plurality of recognition units, which are disposed on a plurality of base materials, and a storage unit.
FIG. 9 is a graph illustrating an example of a relationship between frequency of cells of which DNAs have been replicated and fluorescence intensity.

DESCRIPTION OF EMBODIMENTS (Container)

The container of the present invention, in a first aspect thereof, includes a base material including a plurality of concave portions; a recognition unit disposed on the base material and configured to recognize the base material; and a storage unit disposed on the base material and configured to store information on biomaterials contained in the plurality of concave portions. The recognition unit and the storage unit are allowed to correspond to each other. The container further includes other members, if necessary.

The container of the present invention, in a second aspect thereof, includes a plurality of base materials each including a plurality of concave portions; a plurality of recognition units each disposed on each of the plurality of base materials and configured to recognize each of the plurality of base materials; and a storage unit disposed on the plurality of base material and configured to store information on biomaterials contained in the plurality of concave portions. The plurality of recognition units and the storage unit are allowed to correspond to each other. The container further includes other members, if necessary.

The container of the present invention is based on the finding that, in the related art, a recognition unit configured to recognize a base material is not necessarily allowed to correctly correspond to a storage unit configured to store information on biomaterials contained in concave portions of the base material.

In the present invention, the recognition unit disposed on the base material and configured to recognize the base material is allowed to correspond to the storage unit disposed on the base material and configured to store the information on the biomaterials contained in the plurality of concave portions. Therefore, the storage unit can be correctly corresponded to the recognition unit by mounting the base material in an analyzer and mounting the storage unit in a reader. This makes it possible for the biomaterials to be safely and reliably analyzed or tested. That is, for example, when the container of the present invention is used as a calibration standard plate, the base material should correctly correspond to the information on the biomaterials contained in the concave portions of the base material. Especially when the base material is produced on a large scale, incorrect correspondence may occur. However, the present invention can surely prevent the incorrect correspondence. When an analyzer is calibrated using the container of the present invention as the calibration standard plate, calibration data can be analyzed on a personal computer (PC). Therefore, the incorrect correspondence can be surely prevented.

<Recognition unit>

The recognition unit is a unit disposed on the base material and configured to recognize the base material.

The recognition unit is preferably at least one selected from the group consisting of a recognition portion and a recognition representation.

The recognition portion is preferably at least one selected from the group consisting of a barcode, a two-dimensional barcode such as a QR CODE®, and a radio frequency identifier (RFID). Among them, when the base material is produced on a large scale, the RFID is preferable because the correspondence can be performed via wireless communication. When the base material is inserted in the analyzer, the RFID is also preferable because the correspondence can be performed via wireless communication.

The number of the recognition units may be one for each base material. Alternatively, a plurality of recognition units may be disposed in accordance with the number of the concave portions.

When the recognition unit is the RFID which wirelessly communicates, the recognition unit is preferably disposed adjacent to the reader because a communication range of the RFID is within several tens of meters.

The recognition representation is preferably at least one selected from the group consisting of a character, a symbol, a figure, and a color. Among them, a number is particularly preferable. The recognition representation is more preferable than the recognition portion because the recognition representation is produced at a lower cost, a reader for reading the information of the recognition portion is not required, and the recognition representation can be visually recognized.

The recognition unit is preferably disposed in a position other than insides of the concave portions or peripheral edge portions of the concave portions.

Note that, when the plurality of base materials are used like the container according to the second aspect, the plurality of recognition units each configured to recognize each of the plurality of base materials are disposed in each of the plurality of base materials.

<Storage Unit>

The storage unit is a unit disposed on the base materials, preferably in the position other than a measurement region of the base material and configured to store the information on the biomaterials contained in the plurality of concave portions. Note that, the measurement region of the base material means concave (well) portions which can hold measuring objects (when the base material includes a plurality of concave portions, a region between the plurality of concave portions is also included in the measurement region of the base material).

Examples of the storage unit include memories and IC chips.

The position other than the measurement region of the base material may be the interior or the exterior of the base material, as long as the positions are other than positions which are subjected to measurement.

The storage unit is preferably attachably and detachably disposed to the base material. Regarding a method for attaching or detaching the storage unit, the storage unit may be separated from the base material, if necessary, along perforations disposed in a boundary portion between the base material and the storage unit. Thus, when the base material is inserted in the analyzer, the storage unit may be separated from the base material and then the thus-separated storage unit may be mounted in the reader to allow the storage unit to correspond to the base material.

The storage unit is preferably attached to the base material with an attachment member. Thus, the storage unit can be prevented from being lost. Examples of the attachment member include threads and magnets.

Examples of the information on the biomaterials contained in the concave portions include analysis results (e.g., activity values and light emission intensity), the number of the biomaterials (e.g., the number of the cells), whether the cells are dead or alive, the copy number of certain base sequences, which concave portion contains the biomaterials (i.e., cells) among the plurality of concave portions, positions at which the cell is present in the concave portion, cell types, measurement dates and times, and measurers.

Among the information on the biomaterials, the number of the biomaterials and the copy number of the certain base sequences are preferable.

The information on the biomaterials is preferably the known number of the biomaterials counted.

The information on the biomaterials to be stored in the plurality of storage units is preferably the known number of the biomaterials counted for each of the plurality of concave portions.

The number of the biomaterials may be measured by, for example, a liquid-droplet dispenser and counter described below.

Examples of a method for writing the recognition representation defined as the recognition unit into the base material include a method in which the recognition representation is directly printed onto the base material and a method in which a seal on which the recognition representation is printed is attached onto the base materials.

Examples of a method for writing recognition information into the recognition portion defined as the recognition unit include manual input and a method in which the information is stored in writing devices.

Examples of a method for writing the information on the biomaterials contained in the concave portions of the base material into the storage unit include manual input, a method in which data are directly written from the liquid-droplet dispenser and counter, a method in which data stored in a server are transferred, and a method in which data stored in Cloud are transferred. The liquid-droplet dispenser and counter is a device which dispenses the biomaterials to the concave portions of the base material and counts the number of the biomaterials in the concave portions of the base material. Among them, the method in which data are directly written from the liquid-droplet dispenser and counter is preferable.

Modes of operation of a liquid-droplet ejection unit in the liquid-droplet dispenser and counter are not particularly limited and may be appropriately selected depending on the intended purpose. Examples of the modes of operation include inkjet heads in, for example, piezoelectric pressurization modes using piezoelectric elements, thermal modes using heaters, and electrostatic modes in which liquid is attracted by electrostatic attraction.

Regarding the liquid-droplet dispenser and counter, reference can be made to, for example, Japanese Patent Application Nos. 2016-12260 and 2016-132021.

The recognition representation defined as the recognition unit may be visually read or, when the base material is mounted in the analyzer, read by an internal read mechanism of the analyzer. Alternatively, an external reader of the analyzer may be used.

The recognition information of the recognition portion defined as the recognition unit may be read by the internal read mechanism of the analyzer when the base material is mounted in the analyzer. Alternatively, the external reader of the analyzer may be used.

The information stored in the storage unit may be read by the external reader of the analyzer or, when the base material is mounted in the analyzer, read by the internal read mechanism of the analyzer.

When the recognition unit is the recognition representation, the recognition unit and the storage unit are allowed to correspond to each other by storing the same recognition representation as the recognition representation defined as the recognition unit in the storage unit. The recognition representation may be stored in the storage unit by directly printing the recognition representation onto the storage unit or attaching a seal on which the recognition representation is printed onto the storage unit.

When the recognition unit is the recognition portion, the recognition information of the recognition portion is stored in the storage unit. The recognition information of the recognition portion is stored in the storage unit by, for example, manual input or writing the recognition information with writing devices.

Note that, the recognition information of the recognition portion defined as the recognition unit, the information being read when the base material is mounted in the analyzer, may be collated with information of the base material stored in the storage unit. This makes it possible to check whether the recognition unit and the storage unit are allowed to correctly correspond to each other.

—Biomaterials—

Examples of the biomaterials include (1) microorganisms, (2) substances including nucleotides as components, (3) substances including amino acids as components, and (4) cells.

Examples of the (1) microorganisms include microscopic organisms, for example, bacteria such as *Escherichia coli*, *Bacillus subtilis*, lactic acid bacteria, and thermophilic bacteria; prokaryotes such as cyanobacteria; eukaryotes such as yeasts (e.g., baker's yeast and brewers' yeast), molds (e.g., blue molds), algae (e.g., green algae, brown algae, and red algae); viruses (e.g., retroviruses, cold viruses, adenoviruses, and noroviruses), phages; and protozoa (e.g., *Caenorhabditis elegans*). Among them, bacteria, yeasts, algae, and viruses are preferable, and yeasts are more preferable. These microorganisms may be naturally occurring or produced utilizing genetic recombination techniques.

Examples of the (2) substances including nucleotides as components include nucleic acids such as ribonucleic acids (RNAs) including ribonucleotides as components and deoxyribonucleic acids (DNAs) including deoxyribonucleotides as components, fragments of the nucleic acids, and analogs of the nucleic acids or the fragments of the nucleic acids.

These may have any length and may be single stranded or double stranded. Examples of the nucleic acids or the fragments of the nucleic acids include relatively short oligo- or poly-nucleotides used as, for example, primers, probes, or small interfering RNAs (siRNAs); and long polynucleotides such as genes (including mRNAs) and plasmids.

Examples of the analogs of the nucleic acids or the fragments of the nucleic acids include those in which non-nucleic acid components are linked to the nucleic acids or the fragments of the nucleic acids, those in which the nucleic acids or the fragments of the nucleic acids are labeled with labelling agents such as fluorescent dyes and isotopes (e.g., primers and probes labeled with fluorescent dyes or radioisotopes), and those in which chemical structures of nucleotides constituting the nucleic acids or the fragments of the nucleic acids are partially modified (e.g., peptide nucleic acids). These may be natural products derived from organisms or modified products of the natural products. Alternatively, these may be produced utilizing genetic recombination techniques or chemically synthesized.

Examples of the (3) substances including amino acids as components include peptides including amino acids as components, proteins including amino acids as components, or derivatives of the peptides and the proteins. Types of the amino acids constituting the peptides and the proteins and conformation of proteins are not particularly limited and may be appropriately selected depending on the intended purpose.

Examples of the proteins include simple proteins consisting of amino acids, conjugated proteins in which non-protein substances are bound to simple proteins, and polymeric substances to which a plurality of simple proteins and conjugated proteins are associated as subunits. Examples of the simple proteins include albumin, globulin, prolamin, glutelin, histone, protamine, and scleroproteins. Examples of the conjugated proteins include chromoproteins such as hemoglobin, glycoproteins to which saccharides are attached, lipoproteins to which lipids are attached, nucleoproteins to which nucleic acids are attached, phosphoproteins to which phosphorus is attached, and metalloproteins to which metals are attached.

A type of the proteins is not particularly limited and may be appropriately selected depending on the intended purpose. Examples of the proteins include fibrous proteins (e.g., keratin, collagen, and fibroin) and globular proteins when the proteins are classified in accordance with shape of molecule; intracellular proteins, membrane proteins, secretory proteins, and hemoproteins when the proteins are classified in accordance with localization; and enzyme proteins, hormone proteins, receptor proteins, immunoproteins (e.g., antibodies), and molecular weight marker proteins when the proteins are classified in accordance with function.

Examples of the derivatives of the proteins include those in which the simple proteins or the conjugated proteins are partially hydrolyzed, those in which the simple proteins or the conjugated proteins are thermally coagulated (coagulated proteins), those in which non-proteins are attached to the proteins (e.g., proteins labeled with fluorescent dyes or isotopes), and those in which the chemical structure of side-chains in amino acid residues is modified. Examples of the derivatives of the peptides include those in which non-peptides are attached to peptides (e.g., peptides labeled with fluorescent dyes or isotopes) and those in which the chemical structure of side-chains in amino acid residues is modified. Specific examples of the derivatives include antibodyenzyme complexes produced by chemically crosslinking antibodies with enzymes (e.g., anti-digoxigenin (DIG)-alkaline phosphatase (AP) binding antibodies) and antibody-fluorescent dye complexes.

These proteins, peptides, or derivatives may be natural products derived from organisms or modified products of the natural products. Alternatively, these may be produced utilizing genetic recombination techniques or chemically synthesized. Among them, antibodies, enzymes, hemoproteins, molecular weight marker proteins, antibody-enzyme complexes, and antibody-fluorescent dye complexes may be suitably exemplified.

Examples of the (4) cells include natural cells derived from organisms (animals or plants), established cells, and transformed cells including recombinant genes.

Examples of the animal cells include various cells commonly used in genetic recombination techniques (e.g., mouse fibroblasts, Chinese hamster ovary (CHO) cells, and simian COS cells) or transformants of the above-described cells.

Examples of the plant cells include various cells commonly used in genetic recombination techniques or transformants of the above-described cells.

Among the biomaterials, cells and DNAs having certain base sequences are particularly preferable.

<Base Material>

The material, shape, size, and structure of the base material are not particularly limited and may be appropriately selected depending on the intended purpose. The material of the base material is not particularly limited and may be appropriately selected depending on the intended purpose. Examples of the material include semiconductors, ceramics, metals, glasses, quartz glasses, and plastics.

The shape of the base material is not particularly limited and may be appropriately selected depending on the intended purpose, but is preferably tabular or plate-like. The structure of the base material is not particularly limited and may be appropriately selected depending on the intended purpose. The structure may be a single layered or a multi-layered.

The shape of the concave portions disposed in the base material is not particularly limited and may be appropriately selected depending on the intended purpose. Examples of the shape of the concave portions include flat-bottomed, round-bottomed, U-shaped bottomed, and V-shaped bottomed.

The number of the concave portions disposed in the base material is a plural number, preferably two or more, more preferably five or more, further preferably fifty or more. Specifically, the base material is suitably a multiwell plate. Examples of the multiwell plate include 24-, 48-, 96-, 384-, and 1,536-well plates. Note that, the multiwell plate may not be plate-like but coupled-well tubes such as 8-tube strips.

<Other Members>

Examples of other members include cap members or covering sheets configured to cover the plurality of concave portions.

In the container of the present invention, the base material is allowed to correctly correspond to the storage unit configured to store the information on the biomaterials contained in the plurality of concave portions of the base material. Therefore, the container is widely used in, for example, biotechnology-related industries, life science industries, and medical industries. For example, the container is suitably used for the PCR plate, the cell culture plate, and the calibration standard plate.

(PCR Plate)

The PCR plate used for the present invention includes the container of the present invention, and further includes other members, if necessary.

The biomaterials contained in the concave portions are preferably the DNAs having the certain base sequences.

In the PCR plate, the base material surely corresponds to the information on the biomaterials contained in the concave portions of the base material. This enables safe and reliable PCR. Note that, a plurality types of certain base sequences may be included.

(Cell Culture Plate)

The cell culture plate used for the present invention includes the container of the present invention, and further includes other members, if necessary.

The biomaterials contained in the concave portions are preferably the cells. The number of the cells is preferably counted in advance and known.

In the cell culture plate, the base material surely corresponds to the information on the biomaterials contained in the concave portions of the base material. This enables the cells to be safely and reliably cultured. Note that, a plurality of cell types may be included.

(Calibration Standard Plate)

The calibration standard plate of the present invention includes the container of the present invention, and further includes other members, if necessary.

In the calibration standard plate, the base material surely corresponds to the information on the biomaterials contained in the concave portions of the base material. This enables the analyzer to be safely and reliably calibrated.

The biomaterials contained in the concave portions are preferably the cell or the DNA having the certain base sequence.

Examples of the information on the biomaterials contained in the concave portions include the number of cells and the copy number of the certain base sequences. Note that, a plurality of cell types or a plurality types of certain base sequences may be included.

Embodiments of the container of the present invention will now be described in detail referring to drawings. Note that, in the drawings, identical reference numerals are given to identical constitutional members, and duplicated descriptions may be omitted. Moreover, the number, position, and shape of the constitutional members described below are not limited to the number, position, and shape in the embodiments described below, and the number, position, and shape suitable for the practice of the present invention can be used.

First Embodiment

FIG. 1 is a schematic view illustrating one exemplary container of the present invention. A container 10 in FIG. 1 includes a base material 1 including a plurality of concave portions 2; a recognition portion 3 disposed on the base material 1 and defined as a recognition unit configured to recognize the base material 1; and a storage unit 4 disposed in a position other than (exterior to) a measurement region of the base material 1 to store information on biomaterials contained in the plurality of concave portions 2.

The base material 1 is a polypropylene multiwell plate including 16 concave portions 2.

Note that, the 16 well-multiwell plate is described in FIG. 1, but the same can be also applied to 24 well-, 48 well-, 96 well-, or 384 well-multiwell plates.

The recognition portion 3 defined as the recognition unit allows the base material 1 to correspond to the storage unit 4. This makes it possible to ensure the correspondence between the base material 1 and the storage unit 4 configured to store information on biomaterials contained in the concave portions 2 of the base material 1.

Examples of the recognition portion 3 defined as the recognition unit include a barcode, a two dimensional barcode such as a QR CODE®, and an RFID. Among them, when the base material 1 is produced on a large scale, the RFIDs are preferable because the correspondence can be performed via wireless communication. When the base material 1 is inserted in the analyzer, the RFIDs are also preferable because the correspondence can be performed via wireless communication.

A plurality of recognition portions 3 defined as the recognition unit may be disposed in accordance with the number of the concave portions 2 disposed in the base material 1, as illustrated in FIG. 4A. The plurality of recognition portion 3 may also be disposed on the back surface of the base material 1, as illustrated in FIG. 4B.

Examples of a method for writing the information on the biomaterials into the storage unit 4 include manual input, a method in which data are directly written from the liquid-droplet dispenser and counter, a method in which data stored in a server are transferred, and a method in which data stored in Cloud are transferred. The liquid-droplet dispenser and counter is a device configured to dispense the biomaterials to the concave portions 2 of the base material 1 and count the number of the biomaterials in the concave portions 2 of the base material.

The recognition unit and the storage unit are allowed to correspond to each other by storing information of the recognition portion 3 defined as the recognition unit in the storage unit 4. The information of the recognition portion 3 may be stored in the storage unit 4 by, for example, manual input or automatic input.

The storage unit 4 may be separated from the base material 1, as illustrated in FIG. 1. Alternatively, the storage unit 4 may be attachably and detachably disposed to the base material 1, as illustrated in FIG. 2.

Regarding a method for attaching or detaching the storage unit 4, the storage unit 4 may be separated from the base material 1, if necessary, along perforations 8 disposed in the boundary portion between the base material 1 and the storage unit 4. Thus, when the base material 1 is inserted in the analyzer, the storage unit 4 may be separated from the base material 1 and then the thus-separated storage unit 4 may be mounted in the reader to allow the base material 1 to correspond to the storage unit 4.

The storage unit 4 may be attached to the base material 1 with a thread defined as an attachment member 5, as illustrated in FIG. 3. Thus, the storage unit 4 can be prevented from being lost.

The material of the thread is not particularly limited and may be appropriately selected depending on the intended purpose. Examples of the material include fibers, resins, and metals.

Modification Example 1 of the First Embodiment

FIG. 5 is a schematic view illustrating the container according to Modification Example 1 of the first embodiment. In the Modification Example 1 of the first embodiment, an electronic substrate is used as the container 10. In this case, the container 10 includes the recognition portion 3 configured to recognize regions A, B, C, and D in the electronic substrate and the storage unit 4 configured to store information on the biomaterials corresponding to the regions A, B, C, and D. The recognition portion 3 and the storage unit 4 can be allowed to correspond to each other.

The plurality of recognition portions 3 may be disposed in each of the regions A, B, C, and D in the electronic substrate.

Note that, in Modification Example 1 of the first embodiment, identical reference numerals are given to the identical constitution to the constitution of the first embodiment as already described, and duplicated descriptions are omitted.

Modification Example 2 of the First Embodiment

FIG. 6 is a schematic view illustrating the container according to Modification Example 2 of the first embodiment. In the Modification Example 2 of the first embodiment, a recognition representation 6 (e.g., number) defined as the recognition unit is disposed on the base material in order to allow the base material 1 to correspond to the storage unit 4. The recognition representation 6 (e.g., number) may be directly printed on the base material 1 or a seal on which the recognition representation 6 is drawn may be attached on a surface of the base material 1.

This can realize a lower cost than the cost in the first embodiment due to the absence of the need to use the RFID as the recognition portion 3 defined as the recognition unit. Moreover, compared with the first embodiment, the reader configured to read the information of the recognition portion 3 defined as the recognition unit is not needed, and the correspondence can be easily performed through visual observation of the recognition representation 6.

A position of the recognition representation 6 to be disposed is not particularly limited and may be appropriately selected depending on the intended purpose. The recognition representation 6 is preferably disposed on an upper surface of the base material 1 from the viewpoint of easy visibility. When a plurality of base materials are stacked one on top of another, the recognition representation 6 is preferably disposed on a side surface.

Note that, in the Modification Example 1 of the first embodiment, identical reference numerals are given to the identical constitution to the constitution of the first embodiment as already described, and duplicated descriptions are omitted.

Modification Example 3 of the First Embodiment

FIG. 7 is a schematic view illustrating the container according to Modification Example 3 of the first embodiment. The Modification Example 3 of the first embodiment includes a combination of the recognition portion 3 and the recognition representation 6 defined as the recognition unit. Thus, the combination of the recognition portion 3 and the recognition representation 6 defined as the recognition unit can ensure the correspondence via visual observation and data (wirelessly). That is, in the Modification Example 3 of the first embodiment, the correspondence can be simply performed via visual observation without the need to read the recognition representation 6 with the reader. Alternatively, in the case of the recognition portion 3 of the first embodiment, for example, when the base material 1 is inserted into the analyzer, the correspondence can be performed via data (wirelessly) even if the correspondence is not able to be performed via visual observation.

Note that, in Modification Example 3 of the first embodiment, identical reference numerals are given to the identical constitution to the constitution of the first embodiment as already described, and duplicated descriptions are omitted.

Second Embodiment

FIG. 8 is a schematic view illustrating the container according to the second embodiment of the present invention. The container according to the second embodiment includes a plurality of base materials 1 each including the plurality of concave portions 2; a plurality of recognition units 3a, 3b, . . . , 3z each disposed on each of the plurality of base materials 1 and configured to recognize each of the plurality of base materials 1; and the storage unit 4 disposed in a position other than the measurement region of the plurality of base materials 1 and configured to store the information on the biomaterials contained in the plurality of concave portions 2. The plurality of recognition units 3a, 3b, . . . , 3z and the storage unit 4 are allowed to correspond to each other.

The container according to the second embodiment in FIG. 8 includes one storage unit 4, which is configured to store the plurality of recognition units altogether, for the plurality of base materials each including the plurality of recognition units 3a, 3b, . . . , 3z. Thus, even when the plurality of base materials are sold altogether, only one storage unit 4 is required, resulting in a lower cost.

Note that, in the second embodiment, identical reference numerals are given to the identical constitution to the constitution of the first embodiment as already described, and duplicated descriptions are omitted.

Third Embodiment

The container including the storage unit in which the information on biomaterials is stored has been described in the first embodiment, but an embodiment in the case where the biomaterials are nucleic acids will now be described.

A container according to the third embodiment preferably has not only information on a copy number of the nucleic acids but also information on "uncertainty" specifically described below. Note that, the number of molecules of an amplifiable reagent may be allowed to correspond to the copy number.

The information on the copy number and the uncertainty of the copy number associated with the container may be not only stored in the storage unit described in the first embodiment but also stored in a storage unit of a network server such as Cloud. The embodiment in which the container includes the recognition unit to be allowed to correspond to the storage unit has been described in the first embodiment. However, for example, when a storage unit of a remote network server itself is used as the storage unit, the information may be acquired from the server.

The recognition unit (recognition portion) may be disposed on the container itself or attached to the container as a separate unit or portion.

Information on correspondence of the container to the information on the copy number of the nucleic acids having certain base sequences and the uncertainty of the copy number becomes identifiable.

This allows the correspondence of the container to the information on the copy number when assays or analyzers are calibrated or ensured for accuracy using the container including a known copy number of the nucleic acids having certain base sequences.

—Identification unit—

The container preferably includes an identification unit configured to be able to identify the information on the known copy number of the nucleic acids and the uncertainty of the copy number.

The identification unit is not particularly limited and may be appropriately selected depending on the intended purpose. Examples of the identification unit include memories, IC chips, barcodes, two-dimensional barcode such as a QR CODE®, radio frequency identifiers (RFID), color-coding, and printing.

A position of the identification unit to be disposed and the number of the identification units are not particularly limited and may be appropriately selected depending on the intended purpose.

A method for writing the information into the identification unit is not particularly limited and may be appropriately selected depending on the intended purpose. Examples of the method include manual input, a method in which data are directly written from a liquid-droplet forming device, a method in which data stored in a server are transferred, and a method in which data stored in Cloud are transferred. The liquid-droplet forming device is a device configured to count the number of the amplifiable reagent when the amplifiable reagent is dispensed into wells.

The container of the present invention includes a base material and at least one concave portion (well), has the information on the copy number of the nucleic acids having certain base sequences contained in the at least one concave portion and the uncertainty of the copy number of the nucleic acids, and includes a unit and further other members, if necessary.

The term "uncertainty" is defined as "parameter, associated with the result of a measurement, that characterizes the dispersion of the values that could reasonably be attributed to the measurand" in ISO/IEC Guide 99:2007 [International vocabulary of metrology—Basic and general concepts and associated terms (VIM)].

The phrase "the values that could reasonably be attributed to the measurand" means candidates of true values of the measurand. That is, the uncertainty means information on the dispersion of measurement results due to, for example, operation or equipment used to produce measurement objects. The larger the uncertainty is, the larger the dispersion predicted for the measurement results is.

The uncertainty may be a standard deviation obtained from the measurement results or may be half a confidence level expressed as a value width including the true value at the predetermined probability or higher.

The uncertainty may be calculated based on Guide to the Expression of Uncertainty in Measurement (GUM:ISO/IEC Guide98-3) and Japan Accreditation Board Note 10 Guidelines for Measurement Uncertainty in Testing.

For example, two methods, i.e., Type A evaluation method using statistics of measurement values and Type B evaluation method using information on uncertainty obtained from, for example, calibration certificates, manufacturer's specifications, and published information may be applied as methods for calculating the uncertainty.

The uncertainty can be expressed at the same confidence level by converting all of uncertainties obtained from factors such as operation and measurement to standard uncertainties. The standard uncertainty means dispersion of average values obtained from measurement values.

As an example of the method for calculating the uncertainty, for example, factors causing the uncertainty are extracted and the uncertainty (standard deviation) of each of the factors is calculated. Moreover, the thus-calculated uncertainty of each of the factors is combined by the sum of squares method to calculate combined standard uncertainty. In calculating the combined standard uncertainty, factors having sufficient small uncertainty among the factors causing the uncertainty can be ignored because the sum of squares method is used. For the uncertainty, a coefficient of variation (CV value), which is obtained by dividing the combined standard uncertainty by an expected value, may be used.

Some are conceived as the factors causing the uncertainty. For example, when a plate is produced by introducing the intended nucleic acids (reagents) into cells and then counting and dispensing the cells, examples of the factors causing the uncertainty of the number of the intended nucleic acids in each well include the number of the nucleic acids in the cells, a unit configured to place the cells into a plate, frequency of the cells placed at an appropriate position in the plate, and contamination (incorporation of contaminant) caused through breakage of the cells in a cell suspension liquid to release the amplifiable reagent into the cell suspension liquid.

According to the present invention, provided is a container (test device) including certain nucleic acids and enabling performance evaluation of assays and analyzers based on tests including nucleic acid amplification techniques.

<Method for Producing Container (Test Device)>

A method for producing a container holding cells having the certain nucleic acids will now be described.

The method for producing a container of the present invention includes a cell suspension liquid production step, a liquid droplet landing step, a cell number calculation step, and a nucleic acid extraction step, preferably includes an uncertainty calculation step which is a step of calculating uncertainty of each of the above-described steps, an output step, and a recording step, and, if necessary, further includes other steps. The cell suspension liquid production step is a step of producing a cell suspension liquid which includes a plurality of cells having the certain nucleic acids and a solvent. The liquid droplet landing step is a step of ejecting the cell suspension liquid as liquid droplets to allow the liquid droplets to be sequentially landed on wells of a plate defined as the container. The cell number calculation step is a step of counting the number of the cells included in the liquid droplets by a sensor after ejection of the liquid droplets and before landing of the liquid droplets on the well. The nucleic acid extraction step is a step of extracting the nucleic acids from the cells within the wells.

The number of certain DNA sequences may be counted rather than the number of the cells. Usually, the number of the certain DNA sequences may be considered to be equal to the number of the cells because the certain DNA sequences are selected so as to include one region per cell or are introduced by gene recombination techniques. However, the cells are divided at the certain phase of cell cycle to replicate the nucleic acids within the cells. The cell cycle differs depending on types of the cells, but the expected value and the uncertainty of the number of the certain DNAs included in a single cell can be calculated by taking out the predetermined amount of the cell suspension liquid and measuring the cell cycle of a plurality of cells. This can be performed by, for example, observing cells of which nuclei are stained by a flow cytometer.

The term "uncertainty" means information on the dispersion of measurement results due to, for example, operation or equipment used to produce measurement objects. The term "calculate" means determining a numerical value through calculation.

FIG. 9 is a graph illustrating an example of a relationship between frequency of cells of which DNAs have been replicated and fluorescence intensity. As illustrated in FIG. 9, two peaks appear in the histogram depending on the presence or absence of DNA replication, making it possible to calculate a rate of the cells of which DNAs have been replicated. Based on the thus-calculated results, an average number of the DNAs included in a single cell can be calculated. The average number may be multiplied by the number of the cells counted as described above to calculate an estimated number of the nucleic acids.

The cells are preferably treated so as to control the cell cycle before producing the cell suspension liquid. The number of the certain nucleic acids can be calculated from the number of cells with higher accuracy by allowing the cells to be in the same phase before or after the replication.

The uncertainty of the estimated number of the nucleic acids is preferably calculated. This allows the uncertainty to be expressed as variance or standard deviation and be output. When influences of a plurality of factors are summed, a commonly used square root of a sum of squares of the standard deviation can be used. For example, validity of the number of ejected cells, the number of DNAs in the cells, and a rate of the ejected cells landed within the well may be used as the factors. Among them, some factors having significant influences may be selected and calculated.

<<Uncertainty Calculation Step>>

The uncertainty calculation step is a step of calculating uncertainty in each of the steps such as the cell suspension liquid production step, the liquid droplet landing step, and the cell number calculation step.

The uncertainty may be calculated in the same manner as in the cell suspension liquid production step.

Note that, the uncertainty may be calculated at a next step of the cell number calculation step all at once, or may be calculated at the end of each of the steps such as the cell suspension liquid production step, the liquid droplet landing step, and the cell number calculation step and combined at the next step of the cell number calculation step. In other words, the uncertainty in each of the steps may be appropriately calculated until combined.

<<Output Step>>

The output step is a step of outputting the number of the cells in the cell suspension liquid landed within the well as a counted value counted by a particle number counting unit based on a detection result measured with a sensor.

The counted value means the number of the cells contained in the well counted by the particle number counting unit from the detection result measured with the sensor. The output means that when receiving input, the counted value is transmitted as electronic information by devices such as a motor, a communicator, and a calculator to a server defined as an external counted result storage unit or that the counted value is printed as printed matter.

The output step is also a step of outputting observed or predicted values, which are obtained by observing or predicting the number of cells or nucleic acids in each well of a plate when the plate is produced, to an external storage portion.

The output may be performed at the same time as or after the cell number calculation step.

<<Recording Step>>

The recording step is a step of recording the observed or predicted value output at the output step.

The recording step may be suitably performed at a recording portion.

The recording may be performed at the same time as or after the output step.

The recording means not only giving information to the recording portion but also storing the information in the recording portion.

Then, in order to take reliability of results obtained from a plate including the known number of cells into account, a plate which is known to include a single cell is produced and the uncertainty in the case of the single cell is calculated. Note that, the uncertainties in the case of various numbers of nucleic acids may be calculated for each number of the nucleic acids having certain base sequences using the below-described method.

—Calculation of Uncertainty—

In the present example, the number of the cells in the liquid droplets, the number of the intended nucleic acids in the cell, and contamination of the intended nucleic acids in the concave portion (well) were used as the factor causing the uncertainty.

As the number of the cells in the liquid droplets, the number of the cells in the liquid droplets, which was counted by analyzing images of the liquid droplets ejected from an ejecting unit, and the number of the cells, which was counted by microscopically observing for each of liquid droplets ejected from the ejecting unit and landed on a glass slide were used.

The number of the intended nucleic acids in the cell (cell cycle) was calculated using a rate of cells corresponding to the G1-phase of the cell cycle (99.5%) and a rate of cells corresponding to the G2-phase (0.5%).

As for the number of cells in the well, the number of cells landed within the well among ejected liquid droplets was counted. However, this factor, that is, the number of cells in the well was excluded from calculation of the uncertainty because all liquid droplets were landed within the wells when counting for 96 samples.

The contamination was verified in the following manner. Four microliters of filtrate of an ink was subjected to real-time PCR to verify whether nucleic acids other than the intended nucleic acids in the cells were contaminated in the ink. This procedure was repeated three times. As a result, the nucleic acids other than the intended nucleic acids were detected at a minimum limit of detection in all of the three trials. Therefore, the contamination was also excluded from calculation of the uncertainty.

A combined standard uncertainty is determined by determining standard deviations from measurement values for the factors, multiplying the standard deviations by sensitivity coefficients to unify the units of the standard deviations to a unit of measurand to obtain standard uncertainties, and determining the combined standard uncertainty from the standard uncertainties using the sum of squares method. In the combined standard uncertainty, only about 68% of values in normal distribution are included. Therefore, the uncertainty taking about 95% of values in normal distribution into account can be obtained by determining expanded uncertainty which is double of the combined standard uncertainty. The results are presented in the budget sheet in Table 1 below.

TABLE 1

| Symbol | Factor of uncertainty | Value (±) | Probability distribution | Divisor | Standard uncertainty | Sensitivity coefficient | Standard uncertainty (unit of measurand) |
|---|---|---|---|---|---|---|---|
| u1 | Number of cells in liquid droplets | 0.1037 cells | — | 1 | 0.1037 cells | 1.0290 copies/cell | 0.1067 copies |
| u2 | Number of nucleic acid molecules in cell (cell cycle) | 0.0709 copies | — | 1 | 0.0709 copies | — | 0.0709 copies |
| u3 | Number of cells in well | — | — | — | — | — | — |
| u4 | Contamination | — | — | — | — | — | — |
| uc | Combined standard uncertainty | | Normal distribution | | | | 0.1281 copies |
| u | Expanded uncertainty | | Normal distribution (k = 2) | | | | 0.2562 copies |

In Table 1, the "Symbol" means any symbol which is allowed to correspond to a factor of uncertainty.

In Table 1, the "Value (±)" means an experimental standard deviation of the mean, that is, a calculated experimental standard deviation divided by a value of the square root of the number of data.

In Table 1, the "Probability distribution" means a probability distribution of a factor of uncertainty. In the case of Type A evaluation of uncertainty, the field is left blank. In the case of Type B evaluation of uncertainty, the field is filled with normal distribution or rectangular distribution. In the present example, only the Type A evaluation of uncertainty was performed, so that the fields of Probability distribution are left blank.

In Table 1, the "Divisor" means a number for normalizing uncertainty obtained from each factor.

In Table 1, the "Standard uncertainty" means a value obtained by dividing a value in "Value (±)" by a value in "Divisor."

In Table 1, the "Sensitivity coefficient" means a value used for unifying to a unit of measurand.

For the above results, users can use indices of uncertainties as judgement criteria for reliability of measurement results for each well in experiments by storing the resultant expanded uncertainty for each well as indices of dispersion. Use of the judgement criteria for reliability enables performance evaluation of assays with high accuracy.

Aspects of the present invention are as follows, for example. <I>A container including:

a base material including a plurality of concave portions;

a recognition unit disposed on the base material and configured to recognize the base material; and a storage unit disposed on the base material and configured to store information on hi ° materials contained in the plurality of concave portions, wherein the recognition unit and the storage unit are allowed to correspond to each other.
<2> A container including:
a plurality of base materials each including a plurality of concave portions;
a plurality of recognition units each disposed on each of the plurality of base materials and configured to recognize each of the plurality of base materials, and
a storage unit disposed on the plurality of base materials and configured to store information on biomaterials contained in the plurality of concave portions, wherein the plurality of recognition units and the storage unit are allowed to correspond to each other.
<3> The container according to <2>,
wherein the plurality of recognition units are allowed to correspond to one storage unit.
<4> The container according to any one of <1> to <3>,
wherein the biomaterials include cells.
<5> The container according to <4>,
wherein the biomaterials include DNAs having certain base sequences.
<6> The container according to <5>,
wherein the information on the biomaterials to be stored in the storage unit is a copy number of the certain base sequences.
<7> The container according to <4> or <5>,
wherein a number of the biomaterials contained in the plurality of concave portions is a known number of the biomaterials counted.
<8> The container according to <7>,
wherein the information on the biomaterials to be stored in the storage unit is the known number of the biomaterials counted for each of the plurality of concave portions.
<9> The container according to any one of <1> to <8>,
wherein the recognition unit is at least one selected from the group consisting of a recognition portion and a recognition representation.
<10> The container according to <9>,
wherein the base material includes the recognition portion and the recognition representation, and
wherein the recognition portion and the recognition representation are allowed to correspond to the storage unit.
<11> The container according to <9> or <10>,
Wherein the recognition portion is at least one selected from the group consisting of a barcode, a or two-dimensional barcode such as a QR CODE®, and an RFID.
<12> The container according to any one of <9> to <11>,
wherein the recognition representation is at least one selected from the group consisting of a character, a symbol, a figure, and a color.
<13> The container according to <12>,
Wherein the recognition representation include a number.
<14> The container according to any one of <1> to <13>,
herein the recognition unit is disposed in a position other than insides of the plurality of concave portions or peripheral edge portions of the plurality of concave portions.
<15> The container according to any one of <1> to <14>,
wherein the recognition unit is disposed in each of the plurality of concave portions.
<16> The container according to any one of <1> to <15>,
wherein the recognition n pit is disposed in a plurality of positions of the base material.
<17> The container according to any one of <1> to <16>,
wherein the storage is attachably and detachably disposed to the base material.
<18> The container according to any one of <1> to <17>,
wherein the storage unit is attached to the base material with an attachment member.
<19> The container according to <18>,
wherein the attachment member includes a thread.
<20> A PCR plate including
the container according to any one of <1> to <19>.
<21> A cell culture plate including
the container according to any one of <1> to <19>.
<22> A calibration standard plate including
the container according to any one of <1> to <19>.
<23> A container including
a known copy number of nucleic acids having certain base sequences,
wherein the copy number of the nucleic acids is associated with information on uncertainty of
the copy number of the nucleic acids.
<24> A container including:
a base material including a plurality of concave portions; and
a storage unit disposed on the base material and configured to store information on biomaterial Is contained in the plurality of concave portions,
wherein the biomaterials include nucleic acids having certain base sequences, and wherein the information on biomaterials includes information on a copy number of the nucleic acids and uncertainty of the copy number of the nucleic acids.
<25> The container according to <23> or <24>,
wherein the information on uncertainty of the known copy number is at least one selected from the group consisting of a unit configured to place cells including the nucleic acids into the container, cell cycle of the cells, a number of the cells placed into the concave portions of the container, and contamination of an intended nucleic acid in the concave portions of the container,
<26> A method for calibrating an analyzer using the container according to any one of <23> to <25>.

The container according to any one of <1> to <19> and <23> to <25>, the PCR plate according to <20>, the cell culture plate according to <21>, and the calibration standard plate according to <22>, and the method for calibrating an analyzer according to <26> can solve the above existing problems and can achieve the object of the present invention.

REFERENCE SIGNS LIST

1: base material
2: concave portions
3: recognition unit (recognition portion)
4: storage unit
5: attachment member
6: recognition unit (recognition representation)
8: perforations
10: container

The invention claimed is:
1. A container, comprising:
a base material comprising a plurality of concave portions, the base material having a tabular or plate-like form;
a recognition unit disposed on the base material and configured to recognize the base material; and
a storage unit attached to the base material and configured to store information on biomaterials contained in the plurality of concave portions, wherein at least one of the plurality of concave portions comprises biomaterials, wherein the biomaterials comprise a nucleic acid having a certain base sequence, wherein the information on the biomaterials stored in the storage unit includes information on a copy number of the nucleic acid and uncertainty of the copy number of the nucleic acid, and wherein the recognition unit and the storage unit correspond to each other.

2. A container, comprising:

a plurality of base materials each comprising a plurality of concave portions, each of the plurality of base materials having a tabular or plate-like form;

a plurality of recognition units, each of the plurality of base materials having one of the plurality of recognition units disposed thereon and each of the plurality of recognition units being configured to recognize a respective one of the plurality of base materials; and a plurality of storage units, each of the plurality of base materials having one of the plurality of storage units attached, the plurality of storage units being configured to store information on biomaterials contained in a respective plurality of concave portions for the respective plurality of base materials, wherein at least one of the plurality of concave portions comprises biomaterials, wherein the biomaterials comprise a nucleic acid having a certain base sequence, wherein the information on the biomaterials stored in the respective plurality of storage units includes information on a copy number of the nucleic acid and uncertainty of the copy number of the nucleic acid, and wherein the plurality of recognition units and the plurality of storage units respectively correspond to each other.

3. The container according to claim 1,
wherein the biomaterials comprise cells.

4. The container according to claim 3,
wherein the biomaterials comprise the nucleic acid extracted from the cells.

5. The container according to claim 4,
wherein the information on uncertainty of the copy number of the nucleic acid is at least one selected from a unit configured to place cells comprising the nucleic acids into the container, cell cycle of the cells, a number of the cells placed into the concave portions of the container, and contamination of an intended nucleic acid in the concave portions of the container.

6. The container according to claim 3,
wherein a number of the biomaterials contained in the plurality of concave portions is a known number of the biomaterials counted.

7. The container according to claim 6,
wherein the information on the biomaterials to be stored in the storage unit is the known number of the biomaterials counted tier each of the plurality of concave portions.

8. The container according to claim 1,
wherein the recognition unit is at least one selected from the group consisting of a recognition portion and a recognition representation.

9. The container according to claim 8,
wherein the base material comprises the recognition portion and the recognition representation, and
wherein the recognition portion and the recognition representation correspond to the storage unit.

10. The container according to claim 8,
wherein the recognition portion is at least one selected from the group consisting of a barcode, a two-dimensional barcode, and an RFID.

11. The container according to claim 8,
wherein the recognition representation is at least one selected from the group consisting of a character, a symbol, a figure, and a color.

12. The container according to claim 1,
wherein the recognition unit is disposed in a position other than insides of the plurality of concave portions or peripheral edge portions of the plurality of concave portions.

13. The container according to claim 1,
wherein the recognition unit is disposed in a plurality of positions on the base material.

14. The container according to claim 1,
wherein the storage unit is attachably and detachably disposed to the base material.

15. The container according to claim 1,
wherein the storage unit is attached to the base material with an attachment member.

16. A calibration standard plate, comprising the container according to claim 1.

17. A container, comprising:

a base material comprising a plurality of concave portions, the base material having a tabular or plate-like form; and a storage unit attached to-the base material and configured to store information on biomaterials contained in the plurality of concave portions, wherein at least one of the plurality of concave portions comprises biomaterials, wherein the biomaterials comprise nucleic acids having certain base sequences, and wherein the information on the biomaterials comprises information on a copy number of the nucleic acids and uncertainty of the copy number of the nucleic acids.

18. The container according to claim 17,
wherein the information on the uncertainty of the copy number is at least one selected from the group consisting of a unit configured to place cells comprising the nucleic acids into the container, cell cycle of the cells, a number of the cells placed into the concave portions of the container, and contamination of an intended nucleic acid in the concave portions of the container.

* * * * *